United States Patent [19]

Bailey et al.

[11] Patent Number: 5,247,577
[45] Date of Patent: Sep. 21, 1993

[54] METHODS AND APPARATUS FOR SECURELY ENABLING FEATURES IN HIGHLY INTEGRATED ELECTRONIC CIRCUITS

[75] Inventors: Delbert D. Bailey, Aptos; James Kardach, San Jose, both of Calif.

[73] Assignee: Intel Corporation, Santa Clara, Calif.

[21] Appl. No.: 882,285

[22] Filed: May 13, 1992

[51] Int. Cl.$^5$ .............................................. H04K 1/00
[52] U.S. Cl. ........................................ 380/23; 380/4; 380/25; 380/50
[58] Field of Search ................... 380/3, 4, 23, 24, 25, 380/49, 50; 364/900

[56] References Cited

U.S. PATENT DOCUMENTS

| | | | |
|---|---|---|---|
| 4,680,731 | 7/1987 | Izumi et al. | 380/4 X |
| 4,902,917 | 2/1990 | Simpson | 380/50 X |
| 4,905,188 | 2/1990 | Chuang et al. | 364/900 |
| 5,014,312 | 5/1991 | Lisimaque et al. | 380/25 |
| 5,081,675 | 1/1992 | Kittirutsunetorn | 380/4 |
| 5,117,457 | 5/1992 | Comerford et al. | 380/3 |
| 5,130,519 | 7/1992 | Bush et al. | 380/50 X |
| 5,148,534 | 9/1992 | Comerford | 380/4 X |

OTHER PUBLICATIONS

*Appendix A. Data Encryption Standard*, Federal Information Processing Standards Publication Jan. 15, 1977.

*Primary Examiner*—Tod R. Swann
*Attorney, Agent, or Firm*—Blakely, Sokoloff, Taylor & Zafman

[57] ABSTRACT

Methods and apparatus for securely providing an encryption scheme for a highly integrated circuit arrangement using external function-enabling keys. Unencrypted question and encrypted expected answer values are stored in question and answer registers respectively. The encrypted expected answer value is derived from a suitably secure encryption scheme. An external key chip incorporating a coding block implementing the identical encryption scheme is provided for each optional feature to be enabled. The unencrypted question value is routed to the input of the coding block. The coding block returns an encrypted key answer value to a comparator in the circuit arrangement. The encrypted key answer value is compared to the encrypted expected answer value stored in the answer register and, if equivalent, the comparator signals the circuit arrangement that a match has been found and that the optional function is to be enabled. The unencrypted questions values together with the associated expected answer values may be randomized according to any suitable randomization scheme. Determination of the expected answer values to circumvent the security feature in commercially viable quantities is greatly reduced.

46 Claims, 2 Drawing Sheets

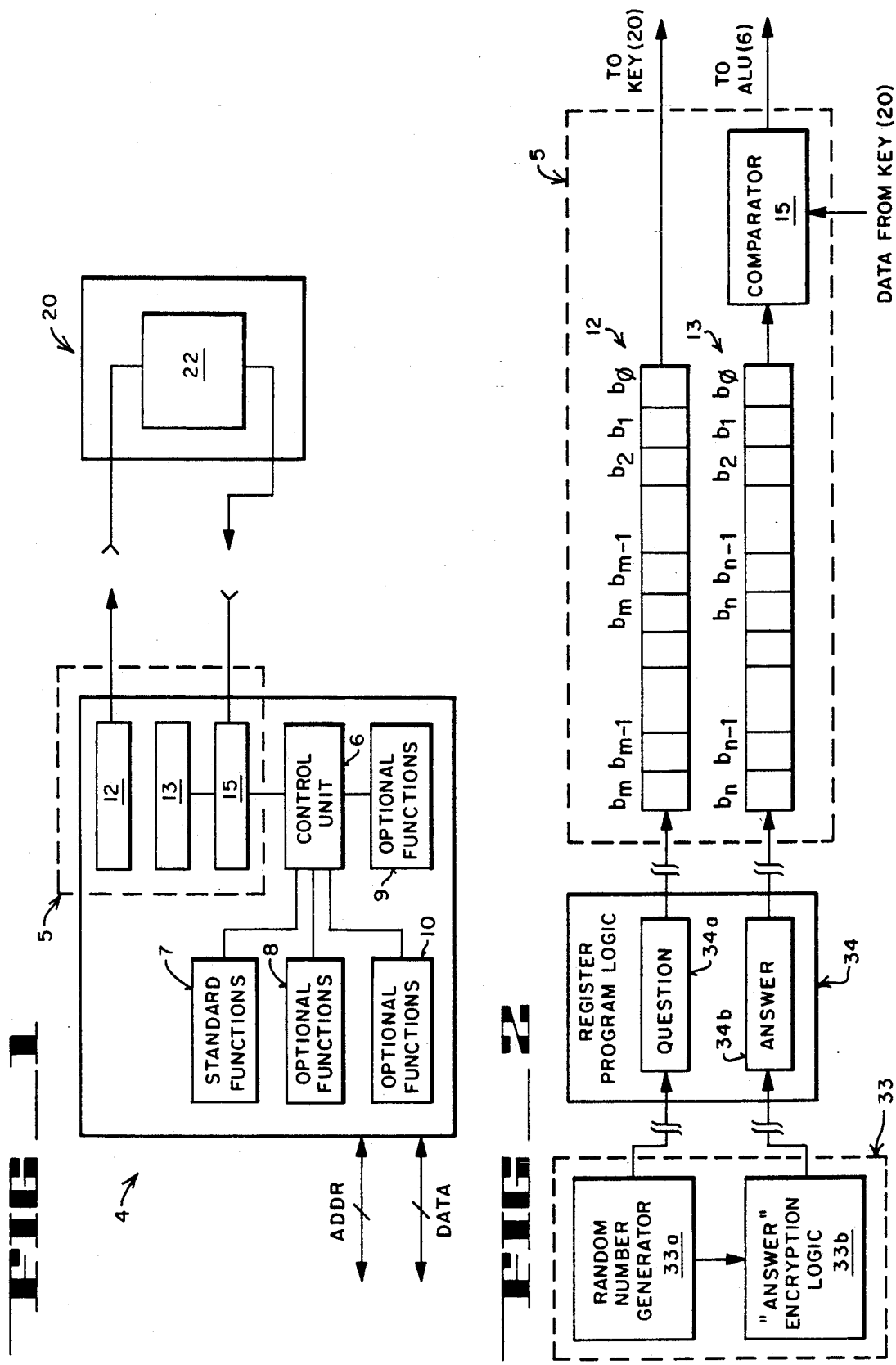

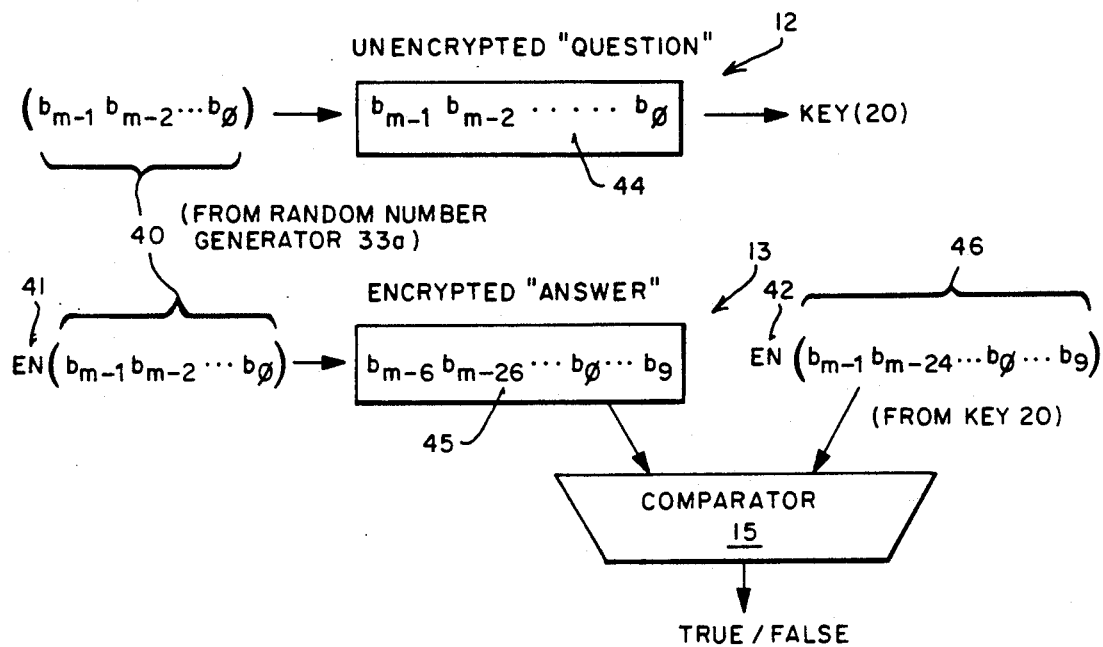
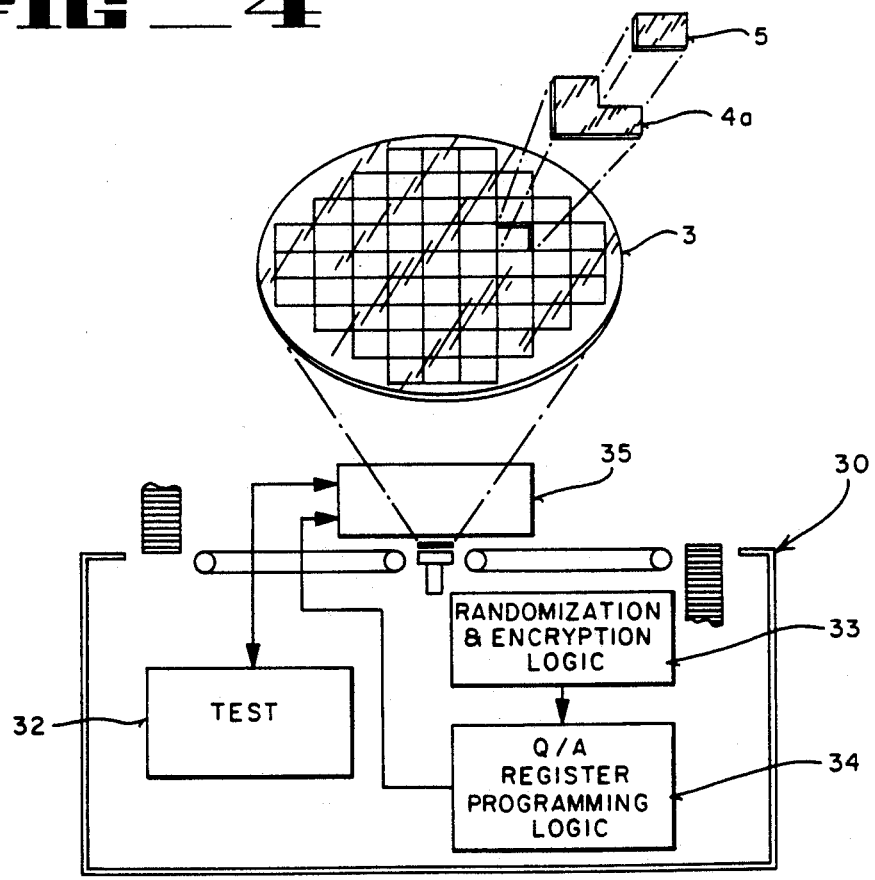

METHODS AND APPARATUS FOR SECURELY ENABLING FEATURES IN HIGHLY INTEGRATED ELECTRONIC CIRCUITS

BACKGROUND OF THE INVENTION

1. Field of the Invention:

The present invention relates generally to electronic circuits and systems, and more particularly relates to security systems used to prevent unauthorized use of particular segments of such electronic circuits and systems.

2. Art Background:

Computers and other electronic systems are frequently configured to permit future upgrades and enhancement according to the needs of the purchaser. Depending on the needs of a computer user, a computer system may be initially configured to meet the customer's base needs, and then subsequently expanded or enhanced to meet the customer's increased computation, or performance needs. In the past, system upgrades and enhancements have been effected by adding circuit components and elements providing the enhancement feature. For example, in a computer system having a base configuration of a central processing unit (CPU), memory, and input/output (I/O) devices, enhanced arithmetic performance may be added by supplementing the base system chip set with additional "off-chip" computing capability, for example an arithmetic "co-processor". Although additional off-chip functionality can be added by providing additional circuit elements and chips, the external and distributed nature of the added elements may, in certain cases, substantially degrade overall system performance. The foregoing is especially true in high performance computation or instrumentation systems, wherein computation or signal transmission times occur in the nanosecond domain.

To avoid degradation of performance whilst permitting field upgradability for computation systems, enhanced or optional features are increasingly being integrated into the CPU chip, which features are enabled by externally added "key" chips. Thus, although the enabling of the advanced or optional feature is external to the CPU, the functional circuitry implementing the feature remains onboard the CPU, thereby avoiding the degradation in performance. However, when CPU chips incorporate such integrated enhanced features and options, it is tempting to enable the advance feature with an unauthorized key and thereby avoid the additional cost of paying for an authorized legitimate key. Depending on the demand and popularity for particular CPU chips, fabrication of unauthorized key chips may reach epidemic proportions, and may cost the manufacturer of the CPU the loss of considerable revenues. Some CPU manufacturers fabricating advanced feature integrated devices may choose to prevent unauthorized use of the integrated feature by restricting dissemination of the interface protocols between the CPU and key chips. For example, a CPU manufacturer may reveal details of the interface only to specific licensees giving assurances of non-disclosure. However, many computer makers are adhering to the "open systems" philosophy and demand unrestricted access to the interface protocols used between chips. Once the restricted information is released, it is a relatively easy matter for a potential "function pirate" to learn the particular protocol used by chip manufacturer. A potential "function pirate" may successfully learn the interface protocol used by opening the integrated circuit and analyzing the circuitry directly using any of several known visual and electrical tests. "Black box" reverse engineering techniques may also successfully yield information regarding the protocols used between a particular set of devices.

Accordingly, inasmuch as system performance may be improved by integrating previously distributed advance or optional features into a main chip, e.g. a CPU, it would be desirable to provide a secure key chip from which it is not possible to extract or determine how to enable the integrated feature. Alternatively, some chip manufacturers may opt to incorporate some sort of on-board encryption scheme into the operation of their chips, wherein a code is passed between the main chip and the key chip to enable the integrated feature. However, all encryption schemes depend upon one or more so-called "key numbers" which are used by the encryption algorithm during the encryption or decryption process. As suggested previously, physical and electrical inspection of the key chip could enable a clever function pirate to ascertain the key numbers contained therein, and thus have access to the entire encryption scheme. Accordingly, it becomes desirable to provide security for the encryption scheme used.

As will be more fully explained in the following detailed description, the present invention provides both methods and hardware apparatus for simply invoking an encryption scheme to eliminate the economic incentive to function pirates attempting to unlawfully utilize integrated advanced features in highly integrated multiple function devices. Providing that the invoked encryption scheme is secure to satisfy the manufacturer's security requirement, any encryption scheme will function in the present invention. In addition, the present invention provides security measures to ensure the key number used in the encryption/decryption process cannot be determined and used to manufacture unauthorized key chips.

SUMMARY OF THE INVENTION

Methods and apparatus for securely providing an encryption scheme for highly integrated electronic devices using external function-enabling keys are disclosed. In the preferred embodiment, question and answer registers are provided on an integrated circuit or other main circuit module having integrated features, some of which are optional features to be secured against unauthorized use. Unencrypted question and expected answer values are programmed or otherwise stored in the question and answer registers, the expected answer value being derived from a suitably secure encryption scheme. The main circuit module also has a control unit which controls the exchange of signals between the main circuit module and a remote key chip. The remote key chip incorporating a coding block implementing the same encryption scheme is provided for each optional feature to be enabled. The unencrypted question value stored in the question register is routed to the input of the coding block located on the remote key chip, the coding block returning an encrypted key answer value. The encrypted key answer value is routed to a comparator in the main circuit module, whereupon the encrypted key answer value is compared to the expected answer value stored in the answer register. The comparator compares the two values and, if equivalent, signals the CPU that a match has been found and that the optional function is to be enabled. The unencrypted question values are randomized according to any appropriate randomization scheme, which scheme may be replaced or modified arbitrarily at the manufacturer's discretion. By removing the randomization scheme for generating the question and answer values from the main circuit module, the likelihood of determination by a function pirate of the expected answer to circumvent the security feature in commercially viable quantities is vastly reduced. In the preferred embodiment, it is anticipated that the randomization and encryption schemes employed will permit coding of unique question and associated expected answer values in individual integrated circuits. Moreover, in the preferred embodiment, the interrogation of the key chip by the control unit can be made to occur at power-up and self-test, before external devices are recognized by the main circuit module. Accordingly, ascertaining the key number or encryption scheme by exhaustive testing is precluded due to the vastly reduced speed at which test numbers may be passed to the main circuit module.

BRIEF DESCRIPTION OF THE DRAWINGS

The present invention will be understood more fully from the detailed description given below and from the accompanying drawings of the preferred embodiment of the invention in which:

FIG. 1 is a block diagram illustration of the preferred embodiment wherein a randomization generator is remote from the main chip, and wherein the main chip has a pair of associated question and expected answer registers programmed in accordance with the encryption scheme.

FIG. 2 is a block diagram illustration of the security system hardware and associated randomization and encryption hardware.

FIG. 3 illustrates a logic diagram of the functional operation of the present invention.

FIG. 4 illustrates conceptually the relationship of the various components of the present invention.

DETAILED DESCRIPTION OF THE INVENTION

Methods and apparatus for securely providing an encryption scheme for highly integrated electronic devices using external function enabling keys are disclosed. In the following detailed specification numerous specific details are set forth, such as registers, bit patterns, etc., in order to provide a thorough understanding of the present invention. It will, however, be obvious to one skilled in the art that the present invention may be practiced without specific details. In other instances, well known circuit and logic structures have not been described in detail in order not to unnecessarily obscure the present invention.

Referring now to FIG. 1, a block diagram illustration of the preferred embodiment of the present invention is shown. In FIG. 1, an integrated circuit arrangement 4, for example a central processing unit (CPU) is shown to contain several constituent subsystems, including a control unit 6, integrated standard functions 7, and one or more optional function modules 8, 9 and 10. Moreover, circuit arrangement 4 contains an encryption module 5 connected to the control unit 6, consisting of a question register 12, answer register 13, and comparator 15. Registers 12 and 13, and comparator 15 are notably of identical size, and may have as many bits as specified by the system designer. In the preferred embodiment, it is anticipated that registers 12 and 13, and comparator 15 have 64 bits to ensure maximum security, as will be explained in more detail below. Associated with a circuit arrangement 4 is a key chip 20 containing a coding block 22. Key chip 20 is physically distinct and remote from circuit arrangement 4, and is inserted into an appropriate slot of the main circuit board (not shown) of the subject computer or electronic system to enable the appropriate optional functions 8, 9, or 10. Significantly, coding block 22 contained within key chip 20 performs an encoding procedure, or encryption procedure, identical to the encoding or encryption scheme used to select values to be stored in question register 12 and answer register 13, as will be now discussed.

Referring now to FIG. 2, a block diagram illustration of the hardware used to implement the present invention is shown. In FIG. 2, security block 5 of circuit arrangement 4 is shown to contain question register 12 and answer register 13, in addition to comparator 15. Question register 12 is illustrated as an M-bit register having bit locations $b_0$-$b_{m-1}$. Similarly, answer register 13 is shown as an N-bit register having bit locations $b_0$-$b_{n-1}$. However, it will be appreciated by one skilled in the art that registers 12 and 13 may be of any size having more or fewer bit locations in order to obtain the present invention. A randomization and encryption logic block 33 is shown to contain a random number generation block 33a whose output is connected to an answer encryption logic block 33b. Randomization and encryption logic block 33 has outputs connected to an external register programming logic block 34. Register programming logic block 34 contains a question register programming block 34a and an answer register programming block 34b receiving, respectively, outputs from random number generator 33a and answer encryption logic 33b. In turn, question and answer register programming blocks 34a and 34b are respectively connected to question register 12 and answer register 13 of security block 5.

In operation, random number generator 33a of randomization encryption logic block 33 generates numeric or alphanumeric values according to an appropriate known randomization scheme. It is anticipated that a sufficiently secure randomization scheme will be used, which will provide a suitably large pool of values to prevent any significant likelihood of prediction by a function pirate of the alphanumeric values that will be stored in registers 12 and 13. In practice, random number generators are in fact not truly random, but only psudeo-random; however, the pseudo-randomness problem may be improved by numerous well known techniques, including providing a "seed" which is then appropriately altered at any chosen interval. The random value supplied by random number generator 33a is then passed to answer encryption logic 33b, whereupon the random value is transformed according to an appropriate data encryption scheme. Although the present invention anticipates that any data encryption may be utilized, it is suggested that, as a minimum, the data encryption scheme invoked be the Data Encryption Standard (DES) as approved by the National Bureau of Standards, U.S. Department of Commerce, as published in *Federal Information Processing Standard* (FIPS), publication 46 (1977). The FIPS DES is suggested because of the very large number of combinations and permutations available under DES, thereby significantly reducing the likelihood of an economically successful attack on the encryption scheme. Particulars of specific encryption schemes or implementations of same will not be discussed here, the reader instead being referred to the aforementioned FIPS DES publication 46, and any of many published texts encryptography, such as those published by Aegean Park Press, Laguna Hills, Calif.

Importantly, it should be noted that the present invention anticipates and provides that the randomization scheme and process be removed entirely from circuit arrangement 4. By taking the randomization scheme "off board", it is essentially impossible for a function pirate to ascertain how a manufacturer of highly integrated chips will select a subsequent question value. The random unencrypted and encrypted data values are then passed to the answer register programming block 34b, whereupon both the question and answer data values are programmed into question and answer registers 12 and 13 in any suitable known fashion, including blowing fusible links, using photomask definition during manufacture of registers 12 and 13, etc. Thus, as manufactured, circuit arrangement 4, e.g. a CPU or any main device using the present invention, is seen to simply contain two data values stored in two physical registers. No special facilities are provided nor necessary for masking, hiding, or in any way rendering unobvious bit patterns stored in question and answer registers 12 and 13 of security block 5. Rather, and as will be discussed further in connection with FIG. 4 below, the selection of random data values and the encryption and programming of such data values into registers 12 and 13 can be selected easily and frequently by the manufacturer, thereby permitting unique question and answer data value pairs to be stored in question and answer registers 12 and 13 of circuit arrangement 4. In anticipation of the discussion below, unique question and answer values can be programmed into individual circuit arrangements 4 sufficiently randomly and frequently to eliminate any economic incentive to function pirates to attempt to determine the encrypted answer necessary to enable the high level functions integrated into circuit arrangement chip 4 and manufacture and distribute unauthorized key chips 20 enabling such functions.

Referring now to FIG. 3, a logic diagram illustrating the functional operations incorporated into the present invention is shown. In FIG. 3, a random data 40 value of arbitrary bit-size M (i.e., $b_o$-$b_{m-1}$) is provided by random number generator 33a, and is stored as the unencrypted question value 44 in register 12 of security block 5. Further, as shown in FIG. 3, the random data value 40 is encrypted according to a chosen encryption function 41 which operates on data value 40 to produce an encrypted expected answer data value 45, which is stored in answer register 13 of security block 5. Unencrypted question value 44 is then passed to key chip 20 which operates upon question value 44 to produce an encrypted key answer value 46. During the operation of the security block 5, it is seen that unencrypted question values 44 are passed to the key chip 20 and are transformed into encrypted key answer values 46 which are then compared against similarly transformed encrypted expected answer values 45 stored in register 13. Importantly, it should be noted that encryption scheme 42 used by key chip 20 is identical to the encryption scheme 41 used to produce the encrypted expected answer values 45 stored in register 13. Expected answer values 45 as stored in register 13 of security block 5, and key answer values 46 as produced by the encryption block 20 of key chip 22 are compared in comparator 15. Comparator 15 produces a TRUE output when a match is found between expected answer values 45 stored in register 13 and key answer values 46 produced by key chip 20. The TRUE output is subsequently passed to the control unit 6 of circuit management 4 to enable the appropriate high level function for which the key chip 20 is supplied. Alternatively, if key chip 20 is not authorized, and does not provide the correct encrypted key answer 46, comparator 15 will produce a FALSE result, and control unit 6 will not enable the selected high level function.

With reference now to FIG. 4, an illustration showing the relative locations of the various features of the present invention is shown. In FIG. 4, security block 5 is seen to form a portion of a main circuit arrangement 4; in this preferred embodiment circuit arrangement 4 may consist of a monolithic integrated circuit 4a. Integrated circuit 4a, when fabricated, is one of many integrated circuits produced on a silicon wafer 3. In the preferred embodiment of the present invention, it is anticipated that the random number generation and encryption scheme be performed on individual integrated circuit chips 4a at the time that such chips are functionally tested after fabrication. Such functional electrical testing is generally accomplished by an automated wafer test station 30, as illustrated in FIG. 4. Automated wafer test station 30, also referred to as an automated test equipment (ATE) system, contains a test vector electronics 32 block, together with randomization and encryption logic 33, and question and answer register programming logic block 34 shown in FIG. 2. Test vector electronics block 32 and register programming logic block 34 are interconnected with a test head 35 which electrically contacts appropriate electrical contact pads (not shown) contained on integrated circuit chips 4a. Multiple wafers 3 are delivered to test head 35 in any of several known transport mechanism schemes, including conveyor belt, vacuum wand, and other known methods. Random number question and encrypted answer values can be programmed into the appropriate question and answer registers 12 and 13 of integrated circuit chip 4 at the same time wafer 3 is functionally tested on automated wafer test station 30. Moreover, using a high-speed wafer test station 30, it is possible to create and program unique unencrypted question values 44 and encrypted answer values 45 for each and every chip 4 contained on each wafer 3 of the manufacturing lot. Such individualized register programming may be easily accomplished using any of several known methods, referred to above, including fusible links.

Any encryption scheme may be accommodated by the present invention, and the present invention is not limited to the DES scheme illustrated herein. Using the DES encryption algorithm and a 64-bit data value for unencrypted question values 20 and encrypted answer values 45, approximately $7 \times 10^{16}$ to $10^{20}$ possible combinations are feasible, depending on the number of bits actually used for the random variable. This is because several bits of unencrypted data value 40 may be assigned as "parity", or for error detection. In the particular case of FIPS DES, 8-bits are used as parity bits and are set to make each of seven 8-bit bytes of a 56-bit variable odd. The 56-bit variable produces over $7 \times 10^{16}$ possible combinations, and has, according to published literature, not been successfully attached since the 1977 DES publication data. Considering that unique unencrypted question and encrypted answer values may be produced for each main circuit element incorporating the present invention, the probability of successfully ascertaining the encryption standard and producing unauthorized key chips in economically viable quantities is vanishing small. However, it is possible that a function pirate having substantial resources, especially money and computation power, could by applying those resources successfully break the DES encryption scheme.

Moreover, one skilled in the art will recognize and appreciate that the encryption scheme utilized in the present invention is afforded an "inherent" second level of security by the manufacturing and distribution processes used to fabricate the circuit arrangements 4. Unless a function pirate could acquire and arrange sufficient circuit arrangements in the exact order they were fabricated to intelligently guess what will be the encrypted answer value for any question value, the probability of successfully attacking the encryption scheme, especially DES, is vanishingly small. Recognizing the myriad ways in which wafer die are sawn apart and distributed within the assembly and test process, not to mention the distribution of finished goods to retail, the likelihood of defeating the present invention's bi-level security feature is diminished even more.

The strength of the present invention's security may be enhanced even more by arranging that the interrogation of key chip 20 by control unit 6 occur at system power-up before external data input devices are enabled. In addition, the response rate to enablement interrogation can be sufficiently slowed to prevent exhaustive testing, but which is transparent on power-up enablement. Interrogating and enabling the optional features at power-up effectively prevents a function pirate from rapidly challenging the circuit arrangement 4 and its key chip 20, as perhaps with a high speed test automated unit. Constraining the interrogation time to system power-up would slow the effective repetition value for test values submitted to key chip 20 so as to make exhaustive testing impracticable. Further, key chip 20 can be made to self-destruct after some fixed number of enablement cycles, which number can be made sufficiently large to permit enablement for any reasonable period of time (say 20 years) but small enough to prevent exhaustive testing for all combinations to ascertain what is the encryption scheme.

Key chips incorporating the encryption scheme 42 used to generate the expected answer 45 may be provided by the manufacturer of circuit arrangement 4 in any quantity necessary to satisfy customer demand for the optional features contained in the integrated device. Moreover, the key chip 20 may be used to provide security for any number of optional features which may be contained on CPU chip 4, the logic implementing encryption scheme 42 being compatible with each feature safeguarded according to the encryption scheme. Thus, a manufacturer of highly integrated electronic circuit components is assured that it may produce and sell complex highly integrated devices for a smaller initial cost to the customer. Entry level customers may therefore obtain the highly integrated device, but only pay for the optional high level features when necessary. Customer growth may therefore be more easily accommodated in terms of costs, but not at the expense of the manufacturer due to unauthorized use of the integrated features enabled by unauthorized key chips.

Thus, the present invention, and in particular the "off-board" randomization scheme, provides security for all aspects of enabling integrated optional features. However, the reader must recognize that the key number contained with the key chip 20 and upon which the encryption scheme depends must be carefully protected. This is especially true in the case of DES, where the encryption algorithm is not only well known, but is also a published standard. Facility must therefore be made wherein the key number is stored in a register that indeterminably destroys itself upon evasive examination. Known techniques exist for securely storing data, such that opening of the key chip 20 to determine the key number immediately destroys the key number. The foregoing is all the more necessary where a particular chip manufacturer likely will use identical key chips to enable all of the optional functions in all products, including making its products backwards-compatible.

The foregoing has described methods and apparatus for securely providing an encryption scheme for a highly integrated electronic device using external function-enabling keys. It is contemplated that changes and modifications may be made by one of ordinary skill in the art, to the encryption schemes and arrangements of elements of the present invention without departing from the spirit and scope of the invention.

We claim:

1. A computer security system to prevent unauthorized use of high level integrated optional features in an integrated circuit arrangement having a control unit, said security system comprising:
   a first level of security for securely determining whether said optional features are to be enabled, comprising:
   means for generating a multiplicity of unencrypted question values and encrypted answer values:
   key means coupled to receive said unencrypted question values for generating a multiplicity of encrypted key values:
   comparison means coupled to receive, respectively, said encrypted answer and encrypted key values:
   and if said encrypted key values match said encrypted answer values, said comparison means signaling said control unit that said key means is authentic and that said high level integrated optional features are to be enabled, and:
   a second level of security comprising means for securing said first level of security.

2. The computer security system according to claim 1, wherein said means for securing said first level of security comprises time delay means for slowing key means response time.

3. The computer security system according to claim 2, wherein said means for securing said first level of security comprises a key number upon which said first level of security depends, and wherein said key means indeterminably destroys said key number if said key means is invasively examined.

4. The computer security system according to claim 2, wherein said means for securing said first level of security comprises means for destroying said key means after a fixed number of enablement cycles.

5. The computer security system according to claim 1, wherein said means for securing said first level of security further comprises means for passing said unencrypted question values to said key means only when said integrated circuit arrangement is powered up.

6. In a computer security system comprising high level integrated optional features in an integrated circuit arrangement having a control unit, a method to prevent unauthorized use of high level integrated optional features comprising the steps of;
   providing a first level of security for securely determining whether said optional features are to be enabled comprising the steps of;
   generating a multiplicity of unencrypted question values and encrypted answer values;
   providing key means coupled to receive said unencrypted question values for generating a multiplicity of encrypted key values;
   providing comparison means coupled to receive, respectively, said encrypted answer and encrypted key values;
   and if said encrypted key values match said encrypted answer values, signaling said control unit that said key means is authentic and that said high level integrated optional features are to be enabled, and;
   providing a second level of security for securing said first level of security.

7. The method according to claim 6, wherein securing said first level of security comprises slowing key means response time.

8. The method according to claim 6, wherein securing said first level of security further comprises passing said unencrypted question values to said key means only when said integrated circuit arrangement is powered up.

9. The method according to claim 6, wherein securing said first level of security comprises providing a key number upon which said first level of security depends, and indeterminably destroying said key number if said key means is invasively examined.

10. The method according to claim 6, wherein securing said first level of security comprises destroying said key means after a fixed number of enablement cycles.

11. In an integrated computer processor system including a control unit, memory, and at least one high level integrated optional feature, a security system comprising:
    question value means for generating a multiplicity of question values;
    a key device coupled to receive said question values from said question value means, said key device transforming said question values to a multiplicity of key answer values;
    answer value means for generating a multiplicity of expected answer values; and,
    comparison means coupled to said key device and said answer value means for receiving, respectively, said key answer values and said expected answer values;
    if said key answer values match said expected answer values, said comparison means signalling said CPU that said key device is authentic and that said high level integrated optional features are to be enabled.

12. The security system as set forth in claim 11, wherein said question value means comprises question value storage means for storing said question values.

13. The security system as set forth in claim 12, wherein said question value means further comprises:
    random number means for providing a multiplicity of random question values; and,
    first programming means for storing said random question values in said question value storage means, said first programming means coupled to receive said random question values from said random number means and thereafter programming said random question values into said question value storage means.

14. The security system as set forth in claim 13, wherein said key device comprises a key chip, said key chip further comprising:
    question value receiving means coupled to said first storage means for receiving said question values;
    a coding block coupled to said answer question receiving means for transforming said question values into said key answer values; and,
    key answer value transmitting means coupled to said comparator means for transmitting said key answer values from said key chip to said comparator means, said control unit thereafter determining whether said key chip is authentic.

15. The security system as set forth in claim 13, wherein said question value storage means comprises a first register.

16. The security system as set forth in claim 15, wherein said first register comprises a 64 bit register.

17. The security system as set forth in claim 16, wherein said question values comprise unencrypted question values.

18. The security system as set forth in claim 17, wherein said answer value means comprise answer value storage means for storing a plurality of answer values.

19. The security system as set forth in claim 18, wherein said answer value means further comprises:
    expected answer generation means coupled to said random number means for generating said expected answer values according to an encryption scheme, said expected answer generation means receiving and transforming said random question values into said expected answer values; and,
    second programming means for storing said expected answer values in said expected answer storage means, said second programming means coupled to receive said expected answer values from said expected answer generation means and programming said encrypted expected answer values into said answer value storage means.

20. The security system as set forth in claim 19, wherein said answer value storage means comprises a second register.

21. The security system as set forth in claim 26, wherein said second register comprises a 64 bit register.

22. The security system as set forth in claim 21, wherein said answer values comprise encrypted expected answer values.

23. The security system as set forth in claim 19 further comprising
    an automated test equipment (ATE) system, wherein said ATE system comprises said random number means, said answer value generation means, and said first and second programming means;
    said random number means, said unexpected answer value generation means, and said first and second programming means, while said ATE system tests said integrated computer processor system after fabrication, cooperatively generating and storing said question values and said expected answer values in said question value and expected answer value storage means, respectively.

24. The security system as set forth in claim 23, wherein said key device comprises a key chip, said key chip further comprising:

question value receiving means coupled to said question value means for receiving said question values;

a coding block coupled to said answer value receiving means for transforming said question values into said key answer values; and, key answer value transmitting means coupled to said comparison means for transmitting said key answer values from said key chip to said comparison means, said CPU thereafter determining whether said key chip is authentic.

25. The security system as set forth in claim 24, wherein said comparison means comprises a comparator coupled to receive said key answer values and said expected answer values, and if said key answer values match said expected answer values, said comparator signalling said CPU that said key chip is authentic, said CPU thereafter enabling said high level optional integrated features.

26. In an integrated computer processor system including a central processing unit (CPU), memory, and at least one high level integrated optional feature, a security system comprising:

a first storage means for storing an encoded question value;

a key device coupled to receive said encoded question value from said first storage means, said key device transforming said encoded question value to a key answer value;

a second storage means for storing an expected answer value; and, a comparator coupled to receive said key answer value and said expected answer value, and if said key answer values match said expected answer values, said comparator signalling said CPU that said key chip is authentic, said CPU thereafter enabling said high level optional integrated feature.

27. The security system as set forth in claim 26, further comprising:

random number means for providing a multiplicity of random question values; and, first programming means for storing said random question values in said first storage means, said programming means coupled to receive said random question values from said random number means and programming said random question values into said first storage means.

28. The security system as set forth in claim 27, wherein said first storage means comprises a question value storage register for storing said question values.

29. The security system as set forth in claim 28, wherein said question value storage register comprises a 64 bit register.

30. The security system as set forth in claim 29, wherein said random question values comprise unencrypted question values.

31. The security system as set forth in claim 30, wherein said answer value means further comprises:

expected answer value generation means coupled to said random number means for generating said question values according to an encryption scheme, said expected answer value generation means receiving said random values selected by said question value generation means and transforming said random question values into a multiplicity of encrypted expected answer values; and, second programming means for storing said encrypted expected answer values in said second storage means, said programming means coupled to receive said encrypted expected answer values from said expected answer value generation means and programming said encrypted expected answer values into said second storage means.

32. The security system as set forth in claim 31 further comprising an automated test equipment (ATE) system, wherein said ATE system comprises said random number means, said question value generation means, and said programming means;

said random number means, said expected answer value generation means, and said first and second programming means, while said ATE system tests said integrated computer processor system after fabrication, cooperatively generating and storing said question values and said expected answer values in said question value and expected answer value registers, respectively.

33. The security system as set forth in claim 31, wherein said second storage means comprises an expected answer value storage register for storing said expected values.

34. The security system as set forth in claim 33, wherein said expected answer value storage register comprises a 64 bit register.

35. The security system as set forth in claim 34, wherein said expected answer values comprise encrypted answer values.

36. In an integrated computer processor system including a control unit, memory, and at least one high level integrated optional feature, a security method for preventing unauthorized use of said high level integrated optional features, said security method comprising the steps of:

generating a multiplicity of question values;

providing a key device to transform said question values into a plurality of key answer values;

generating a plurality of expected answer values; and, comparing said key answer values and said expected answer values in a comparison means;

if said key answer values match said expected answer values; signalling said control unit that said key device is authentic and that said high level integrated optional features are to be enabled.

37. The method as set forth in claim 36, wherein generating said multiplicity of question values comprises providing question value storage means for storing said question values.

38. The method as set forth in claim 37, wherein generating said multiplicity of question values further comprises the steps of:

providing a multiplicity of random question values; and, storing said random question values in said question value storage means.

39. The method is set forth in claim 38, wherein said random question values are stored in a first register.

40. The method as set forth in claim 39, wherein generating said question values comprises providing encrypted question values.

41. The method according to claim 40, further comprising the steps of:

receiving a multiplicity of random question values transforming said random question values into a plurality of encrypted expected answer values according to an encryption scheme; and, storing said encrypted expected answer values in an expected answer storage means.

42. The method as set forth in claim 41, wherein storing said encrypted expected answer values in said expected answer storage means comprises storing said encrypted expected answer values in a second register.

43. The method as set forth in claim 42, wherein said second register comprises a 64 bit register.

44. The method as set forth in claim 41 further comprising the steps of:
providing an automated test equipment (ATE) system, wherein said ATE system comprises said random number means, said question value generation means, and said programming means;
while said ATE system tests said integrated computer processor system after fabrication, cooperatively generating and storing said question values and said expected answer values in said question value and expected answer value storage means, respectively.

45. The method as set forth in claim 44, wherein providing said key device comprises:
providing a key chip;
receiving said question values in a coding block and transforming said question values into said key answer values; and,
transmitting said key answer values from said key chip to said comparison means, said control unit thereafter determining whether said key chip is authentic.

46. The method as set forth in claim 45, wherein providing said comparison means comprises providing a comparator coupled to receive said key answer values and said expected answer values, and if said key answer values match said expected answer values, signalling said control unit that said key chip is authentic, said control unit thereafter enabling said high level optional integrated features.

* * * * *